United States Patent
Shintani et al.

(10) Patent No.: US 12,218,778 B2
(45) Date of Patent: Feb. 4, 2025

(54) ENERGY EFFICIENT METHOD FOR HOME NETWORKING

(71) Applicant: Sony Group Corporation, Tokyo (JP)

(72) Inventors: Peter Shintani, San Diego, CA (US); Adam Goldberg, Fairfax, VA (US)

(73) Assignee: Sony Group Corporation, Tokyo (JP)

( * ) Notice: Subject to any disclaimer, the term of this patent is extended or adjusted under 35 U.S.C. 154(b) by 1 day.

(21) Appl. No.: 17/812,682

(22) Filed: Jul. 14, 2022

(65) Prior Publication Data

US 2024/0022448 A1    Jan. 18, 2024

(51) Int. Cl.
*H04L 12/28* (2006.01)

(52) U.S. Cl.
CPC ...... *H04L 12/2805* (2013.01); *H04L 12/2816* (2013.01); *H04L 2012/2841* (2013.01)

(58) Field of Classification Search
CPC ............. H04L 12/2805; H04L 12/2816; H04L 2012/2841
See application file for complete search history.

(56) References Cited

U.S. PATENT DOCUMENTS

| | | | | |
|---|---|---|---|---|
| 8,369,304 B2 * | 2/2013 | Sengottaiyan | .... | H04W 52/0229 370/429 |
| 8,966,292 B2 * | 2/2015 | Soliman | ............ | H04W 52/0229 713/323 |
| 9,137,602 B2 * | 9/2015 | Mayman | ................ | G06F 1/1632 |
| 9,182,808 B1 * | 11/2015 | Jones | .................... | G06F 1/3209 |
| 9,591,582 B1 * | 3/2017 | Rabii | ..................... | H04L 43/028 |
| 9,769,645 B2 * | 9/2017 | Patil | ........................ | H04W 8/005 |
| 9,936,444 B2 * | 4/2018 | Knowles | ............... | H04W 48/08 |
| 10,119,714 B2 * | 11/2018 | Amer | ..................... | H04L 67/1001 |
| 10,230,596 B2 * | 3/2019 | Vandwalle | ............ | H04W 8/005 |
| 10,255,643 B2 * | 4/2019 | Lu | .......................... | H04W 4/029 |
| 10,477,372 B2 * | 11/2019 | Ray | ........................ | H04W 4/80 |
| 10,631,090 B1 * | 4/2020 | Elliot | ..................... | H04R 29/007 |
| 11,076,015 B2 * | 7/2021 | Isberg | ................. | H04W 52/0251 |
| 11,409,509 B2 * | 8/2022 | Yoon | ................... | H04L 12/2832 |
| 11,570,709 B2 * | 1/2023 | Wang | ................. | H04W 52/0225 |

(Continued)

FOREIGN PATENT DOCUMENTS

CN    114422029 A    4/2022

OTHER PUBLICATIONS

Jabbar et al., "Design and Fabrication of Smart Home with Internet of Things Enabled Automation System", IEEE Access, vol. 7, Sep. 23, 2019.*

(Continued)

*Primary Examiner* — Todd L Barker
(74) *Attorney, Agent, or Firm* — John L. Rogitz; John M. Rogitz

(57) ABSTRACT

To reduce energy consumption in a low power mode, a display device such as a TV deenergizes its display and components in its network stack while leaving its infrared (IR) receiver on. A home network device that is not a conventional TV remote control (RC), for instance, a smart speaker, can receive a voice command to energize the TV, and instead of sending a wake up command to the TV through the home network, transmits an IR wake up command or sonic wake up command or non-IP RF command to the TV, which energizes its network stack and display in response.

16 Claims, 5 Drawing Sheets

(56) References Cited

U.S. PATENT DOCUMENTS

| | | | | |
|---|---|---|---|---|
| 11,777,965 | B2* | 10/2023 | Du | H04L 63/20 |
| | | | | 726/23 |
| 2003/0212465 | A1* | 11/2003 | Howard | G10L 15/26 |
| | | | | 704/E15.045 |
| 2006/0251059 | A1 | 11/2006 | Otsu | |
| 2009/0132839 | A1* | 5/2009 | Rothman | G06F 21/554 |
| | | | | 713/320 |
| 2010/0118209 | A1 | 5/2010 | Hardacker | |
| 2011/0170464 | A1* | 7/2011 | Sengottaiyan | H04W 52/0229 |
| | | | | 370/311 |
| 2011/0242268 | A1 | 10/2011 | Kim | |
| 2012/0173901 | A1* | 7/2012 | Soliman | H04W 88/182 |
| | | | | 713/320 |
| 2012/0226756 | A1* | 9/2012 | Lindquist | H04N 21/4432 |
| | | | | 709/204 |
| 2015/0198500 | A1* | 7/2015 | Komninos | G01M 3/24 |
| | | | | 381/56 |
| 2015/0271745 | A1* | 9/2015 | Knowles | H04W 8/24 |
| | | | | 370/254 |
| 2016/0020854 | A1* | 1/2016 | Engel | H04B 10/116 |
| | | | | 398/118 |
| 2016/0025364 | A1* | 1/2016 | Mills, Jr. | F24F 11/63 |
| | | | | 700/278 |
| 2016/0072638 | A1* | 3/2016 | Amer | F24F 11/62 |
| | | | | 398/106 |
| 2016/0353233 | A1* | 12/2016 | Yong | H04L 67/51 |
| 2017/0109840 | A1* | 4/2017 | Lu | H04W 12/02 |
| 2019/0369577 | A1* | 12/2019 | Kim | H04L 12/2814 |
| 2019/0387011 | A1* | 12/2019 | Du | H04L 63/20 |
| 2020/0177485 | A1* | 6/2020 | Shurtleff | H04L 41/142 |
| 2020/0229088 | A1* | 7/2020 | Wang | H04W 52/0225 |
| 2020/0304589 | A1* | 9/2020 | Isberg | H04L 67/12 |
| 2021/0106187 | A1* | 4/2021 | Murphy | A47K 10/38 |
| 2021/0314222 | A1* | 10/2021 | D'Amato | H04L 41/0893 |
| 2022/0038836 | A1* | 2/2022 | Carlsson | H04S 7/301 |
| 2022/0066730 | A1* | 3/2022 | Warren | H04R 1/023 |
| 2022/0150831 | A1* | 5/2022 | Di Marco | H04W 4/80 |
| 2022/0232667 | A1* | 7/2022 | Back | H04W 76/28 |

OTHER PUBLICATIONS

Ramakrishnan et al., "IoT based Industrial Automation for Various Load using ATmega328p Microcontroller", 2022 6th International Conference on Intelligent Computing and Conrol Systems (ICICCS), May 25, 2022.*

IP_COM_NPL "Camera Lens wih Display Mode", IPCOMOOO255165D, Sep. 6, 2018.*

Satheeskanth et al., "IoT Based Integrated Smart Home Automation System", Ubiquitous Intelligent Systems Conference, Oct. 9, 2021, pp. 341-355.*

Ramakrishnan et al., "IoT based Industrial Automation ford Various Load using ATmega328p Miicrocontroller", 2022 6th International Conference on Intelligent Computing and Control Systems, May 25, 2022.*

Ayers et al., "Design considerations for low power internet protocols", Jun. 27, 2018.*

Agrawal et al., "Energy Efficient protocols for wireless systems", IEEE International Symposium on Personal, Indoor and Mobiile Radio Communications, vol. 2, pp. 564-569, Sep. 1998, IEEE Publishing.*

P_Agrawal et al.,"Energy Conservation Design Techniques for mobile wireless VLSI sytems", IEEE Computer Society Workshop on VLSI'98 System Level Design, Sep. 1998.*

Glistvain et al,"Bringing TCP/IP newtorking to resource limited embedded systems", IEEE/ASME International Conference on Mechanic and Embedded Systems and Applications, pp. 239-244 , Sep. 3, 2010.*

Kumar et al., "Performant TCP for Low Power Wireless Networks" Feb. 25, 2020.*

Araujo et al., "YetiOS:an Adaptive Opeating System for Wireless Sensor Networks" 2018 IEEE43rd Conference onLocal Computer Newtorks Workshops, Oct. 1, 2018, IEEE Publishing.*

Satheeskanth et al., "IoT Based Integrated Smart Home Automation System", Ubiquitous Intelligent Sytems Conference, Oct. 9, 2021, pp. 341-355.*

Buford et al. "Sleeper: A ower-Conserving Service Discovery Protocol", Third Annual International Conference on Mobile and Ubiquitous Systems: Networking & Servivces, Jul. 17, 2006.*

Pensas et al., "Energy Efficient Sensor Network with Service Discovery for Smart Home Environments" Jun. 18, 2009.*

Bose et al, "LEPaNTU:Long Polling Based Energy Efficient Passive NAT Traversal through UDP", 7th International Conference on Future Internet of Things and Cloud , Aug. 1, 2019, pp. 259-264.*

Chaitanya et al., "IOT based Smart IR Device using CC3200", Indian Journal of Science and Technology, vol. 9(16), DOI: 10.17485/ijst/2016/v9i10/88900, Apr. 2016.

Anonymous: "Sircs description", Aug. 17, 1998 (Aug. 17, 1998), XP093083871, Retrieved from the Internet: URL:https://www.fs.tum.de/~thormann/TGI/Assembler/sircs.html [retrieved on Sep. 20, 2023].

* cited by examiner

ENERGY EFFICIENT METHOD FOR HOME NETWORKING

FIELD

The present application relates generally to energy efficient techniques and systems for home networking.

BACKGROUND

Many consumer electronics (CE) devices in a home are network connected. As understood herein, network connectivity requires a significant amount of software, such as an IP stack at the minimum, to be active if connectivity is required. This requires devices in a low power mode, such as a TV in a sleep mode, to maintain its network stack energized to receive commands over the network from other network devices, making minimizing energy consumption difficult as sufficient processing power must be consumed to maintain the network connectivity in the low power mode. Furthermore, depending upon the system-on-a-chip (SOC) architecture used by the TV, it may be difficult to partition the processor to allow low power consumption.

SUMMARY

Present principles reduce power consumption of a display device such as a TV while in a low power mode by not requiring the TV to maintain an Internet Protocol (IP) or network stack and network connectivity while in the low power mode. The TV maintains an IR reception circuit energized. Hence, a non-remote control (RC) device such as a smart speaker can command the TV to exit the low power mode and enter a full power mode not by sending an IP command to the TV but by transmitting an IR message to the TV, whose current architecture will allow it to wake up to the IR command. The command from the non-RC device may be a dedicated IR command or a generic wake up command followed by additional commands via IR or via IP since the TV will be awake following the initial IR command from the non-RC device. Advantageously, present principles do not have any cost impact on the TV, its architecture, or power supply topology.

A smart speaker or other internet of things (IoT) device that might be requested to turn on the TV would likely be in the same room as the TV, so there is no need to rely upon a wake-up mechanism other than IR. However, an additional mode is provided for the device to send an audible chirp to wake up the TV if the TV has a microphone in home networks in which there is no line of sight or reflective IR path between the TV and the device commanding it to wake up. A non-IP RF signal also may be used. In addition to saving power, the system security is increased because the TV cannot be energized by a hacker gaining access to the IP-based network.

A networked device comprises at least one transmitter and at least one processor configured to send a non-Internet Protocol (IP) signal through the transmitter to at least one appliance to be controlled (ATBC) to cause the ATBC to change from a first power state to a second power state, the first power state consuming less energy than the second power state. The processor subsequently communicates with the ATBC using IP. The non-IP signal may be an infrared (IR) wakeup signal, a sonic signal, or a radiofrequency signal such as may be defined by Institute of Electrical and Electronics Engineers (IEEE) standards 802.15.1, 802.15.4, or 802.3. The ATBC may be implemented by a TV and the networked device may be implemented by a networked speaker device such as a digital assistant that responds to voice commands.

Accordingly, an assembly includes at least one processor configured with instructions to enter a low power mode of a controlled appliance. In the low power mode, at least one video display of the controlled appliance is deenergized and at least one computer network communication element and/or system on a chip (SOC) processor is deenergized. The instructions are executable to, responsive to an infrared (IR) command and/or sonic command and/or non-Internet Protocol (IP) radiofrequency (RF) command from a networked device, energize the video display and configure the at least one computer network communication element and the SOC processor in an energized mode, and communicate via IP with the networked device using the at least one computer network communication element.

The controlled appliance may include a TV and the networked device can include an Internet of Things (IoT) device such as a speaker assembly configured to communicate via IP over a computer network such as a home entertainment network.

The at least one computer network communication element that is deenergized in the low power mode may include at least a network layer, a transport layer, and an application layer in a network stack.

In another aspect, an assembly includes at least one processor configured with instructions to, responsive to a command to energize a controlled appliance, transmit to the controlled appliance at least one infrared (IR) and/or sonic command and/or non-Internet Protocol (IP) radiofrequency (RF) command to cause the controlled appliance to energize at least one video display of the controlled appliance and at least one computer network communication element of the controlled appliance. The instructions are executable to communicate with the controlled appliance via IP using the at least one computer network communication element.

In another aspect, a method includes responsive to a command input to a networked device, sending an infrared (IR) and/or sonic signal and/or non-Internet Protocol (IP) radiofrequency (RF) command from the networked device to at least one controlled appliance that has at least one display, at least one computer network communication element, and at least one system on a chip (SOC) processor. The method further includes, responsive to the signal, energizing the at least one display and the at least one computer network communication element and/or the SOC processor to facilitate computer network communication between the networked device and the controlled appliance.

The details of the present application, both as to its structure and operation, can be best understood in reference to the accompanying drawings, in which like reference numerals refer to like parts, and in which:

DETAILED DESCRIPTION

Figure 1:
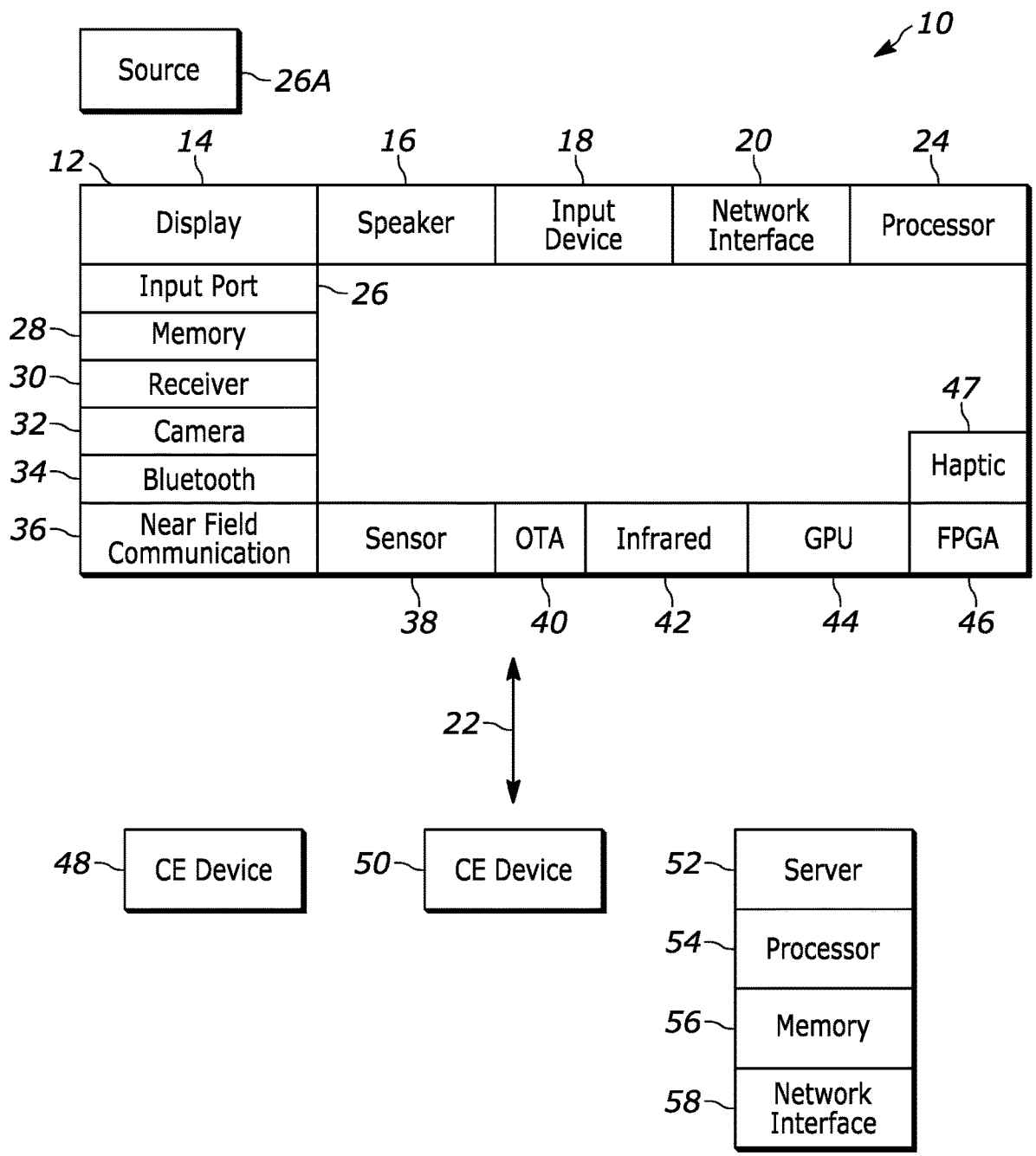
FIG. 1 is a block diagram of an example system in accordance with present principles.

This disclosure relates generally to computer ecosystems including aspects of consumer electronics (CE) device networks such as but not limited to home entertainment networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, display devices such as portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a smart speaker assembly or other device and may not have a video display. Or, the first CE device 48 may include a computer game console that can be used to send computer game audio and video to the AVD 12 via commands sent directly to the AVD 12 and/or through the below-described server. A second CE device 50 may include similar components as the first CE device 48. In the example shown, the second CE device 50 may be configured as a remote control (RC) for the AVDD 12. Or, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or more devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Figure 2:
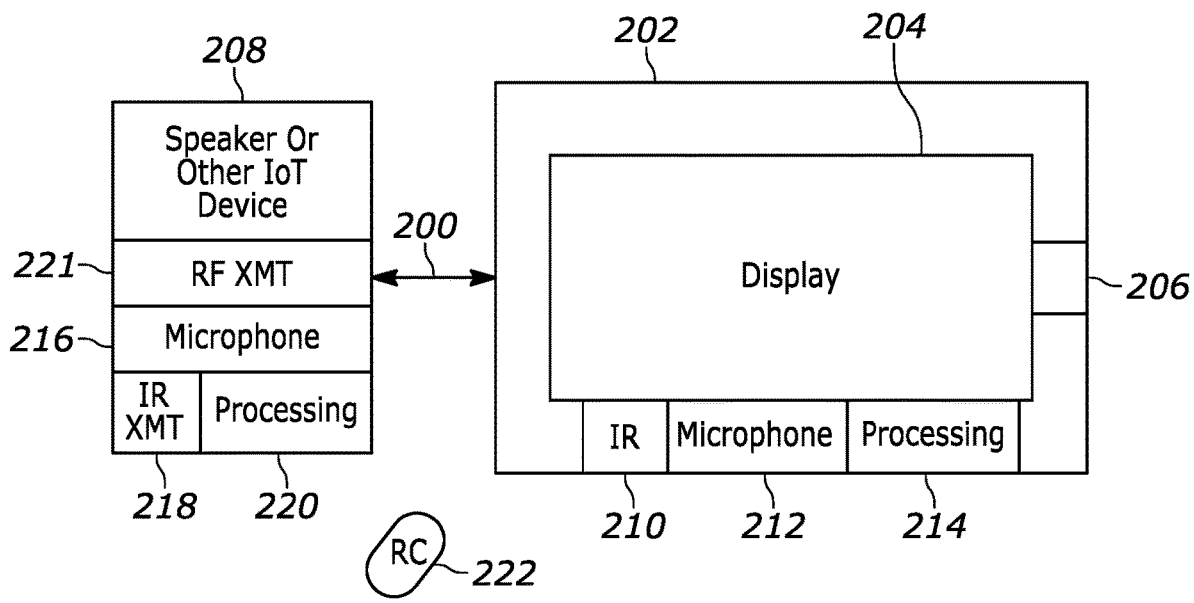
FIG. 2 illustrates an example home network consistent with present principles.

FIG. 2 illustrates a home entertainment network 200 over which one or more appliances 202 such as one or more display devices such as a TV with a video display 204 and speakers 206 communicate with one or more networked devices 208 such as a smart speaker that may be embodied by a digital assistant, it being understood that the networked device 208 shown may be other than a speaker and may be, for example only, a digital voice assistant, a computer game component such as a console or controller, or in general other device with computer network connectivity capability, generally referred to as an "internet of Things" (IoT) device. Similarly, the appliance 202 may be implemented by an IoT device other than a TV, for example, a refrigerator or other appliance. In the disclosure below, for simplicity the appliance 202 may be referred to as the example display device, it being understood that a display device such as a TV is an example of a controlled appliance.

In the example shown, the display device 202 includes one or more of the components of the AVDD 12 shown in FIG. 1 and/or other components such as an IR receiver 210 for receiving IR commands, one or more microphones 212 for receiving sonic signals, and processing circuitry 214 such as one or more processor with attendant computer storage devices.

The networked device 208 may include one or more microphones 216, one or more IR transmitters 218, and processing circuitry 220 such as one or more processor with attendant computer storage devices. The networked device 208 is configured to communicate with the display device 202 over the computer network 200 using, e.g., IoT communication principles that may employ an RF-based transmitter 221 such as an IEEE 802.15.1 transmitter (such as Bluetooth™), an IEEE 802.15.4 transmitter (such as Zig-Bee™), or an IEEE 802.3 transmitter (Ethernet).

Note that a hand-held remote control (RC) 222 may also be provided that may not include IP communication capability, and that instead is used to communicate commands to the display device 202 using IR or RF signaling. In the latter case, the non-IP RF remote may be paired to the display device 202 and send information below the IP layer, such as the network interface layer or data link layer, to the display device.

Figure 3:
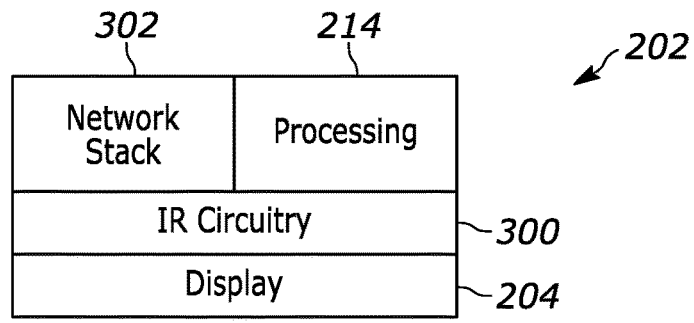
FIG. 3 illustrates an example block diagram of components within the display device.

FIG. 3 illustrates that the display device 202 may include, in addition to the processing circuitry 214 and display 204, IR circuitry 300 for processing signals from the IR transmitter 218 of the networked device 208 as well as from the RC 222, sending signals to the processing circuitry 214. The display device 202 also may include a network stack 302 for communicating over the network 200, which may be wired and/or wireless and which is described further below in reference to FIG. 7.

Figure 4:
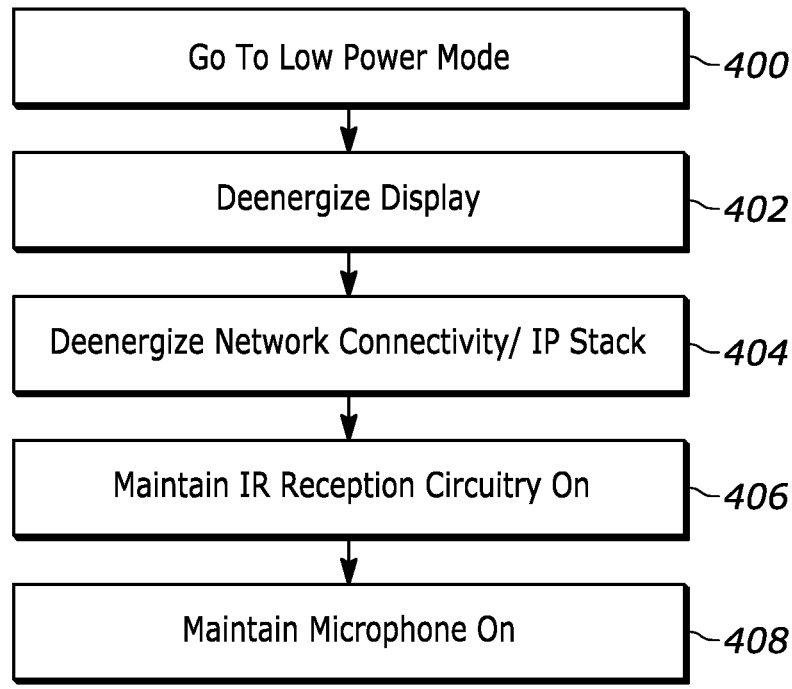
FIG. 4 illustrates example logic in example flow chart format for low power mode operation of the display device.

With FIGS. 2 and 3 in mind, turn now to FIG. 4. Commencing at block 400, the display device 202 is placed in a low power mode, sometimes referred to as a sleep mode. This may be done, by way of non-limiting examples, automatically after a period of time of inactivity or lack of input commands or in response to a signal from another device such as the RC 222 or networked device 208 shown in FIG. 2.

Responsive to the low power mode, the display 204 is deenergized at block 402 and the network stack 302/network connectivity 302 is deenergized in whole or in part at block 404. For example, only the most energy-consuming elements of the network stack 302 may be deenergized as discussed further below in reference to FIG. 7 or the entire network stack 302 may be deenergized. The result in either case is that the display device 202 in the low power mode saves power. However, as indicated by block 406, the IR circuitry 300 shown in FIG. 3 remains energized in the low power mode, so that IR commands received by the display device 202, including IR commands to wake up (i.e., enter a full power mode) can be received and processed. Also, in some implementations, if desired the microphone 212 of the display device 202 may remain energized in the low power mode.

Figure 5:
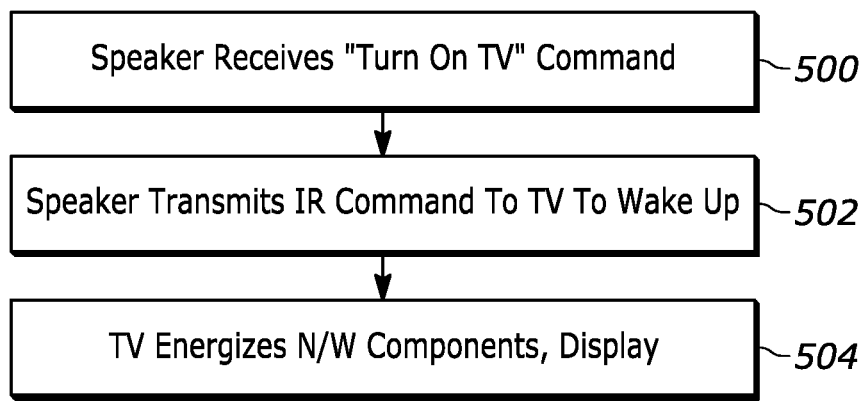
FIG. 5 illustrates first example logic in example flow chart format for emerging from low power mode operation of the display device.

FIG. 5 illustrates a first technique for waking up the display device 202 that does not depend on network connectivity with the networked device 208. Commencing at block 500, the networked device 208 (such as a smart speaker) receives a command, e.g., a voice command or other mode of input command, to energize the display 202. In response, the networked device 202 transmits, at block 502, an IR command to the display device 202 to enter the high-power mode in which the display device 202 energizes, at block 504, the display 204 shown in FIG. 2 as well as the network stack/network communication components 302 shown in FIG. 3. Thereafter, in the high-power mode, the display device 202 communicates with the networked device 208 over the network 200 shown in FIG. 2. For example, within a short period of time such as a second or two after sending the command to enter the high-power mode, the networked device 208 may send an IP-based discovery message to the display device 202 to poll the display device 202 to establish IP communication between the networked device and display device.

Figure 6:
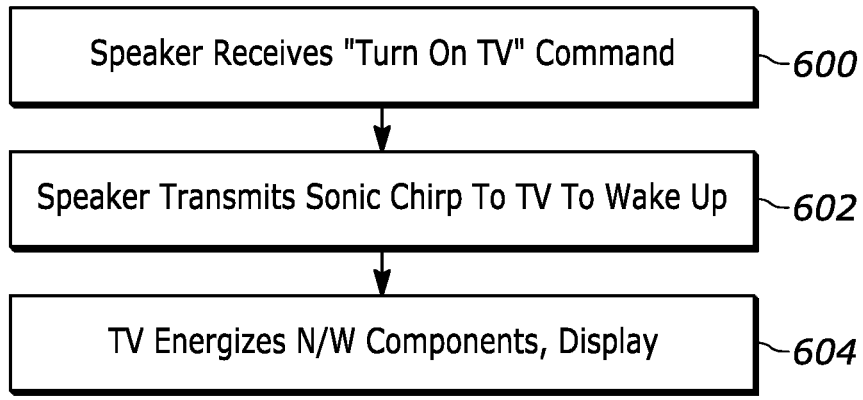
FIG. 6 illustrates second example logic in example flow chart format for emerging from low power mode operation of the display device.

FIG. 6 illustrates a second technique for waking up the display device 202 that does not depend on network connectivity with the networked device 208. Commencing at block 600, the networked device 208 (such as a smart speaker) receives a command, e.g., a voice command, to energize the display 202. In response, the networked device 202 transmits, at block 602, a sonic command such as a brief chirp to the display device 202 to enter the high-power mode in which the display device 202 energizes, at block 604, the display 204 shown in FIG. 2 as well as the network stack/network communication components 302 shown in FIG. 3. Thereafter, in the high-power mode, the display device 202 communicates with the networked device 208 over the network 200 shown in FIG. 2. For example, within a short period of time such as a second or two after sending the command to enter the high-power mode, the networked device 208 may send an IP-based discovery message to the display device 202 to poll the display device 202 to establish IP communication between the networked device and display device.

Note that in some embodiments, the entire IP interface and software stack may not be unpowered in the low power mode, but only partially powered such that packets may be received and buffered in the IP interface or the lower physical (Phy) layers of the stack. However, the processing circuitry 214 when configured as a system on a chip (SOC) is deenergized in the low power mode so that processing of the packets is stopped in the low power mode because the relatively power-hungry SOC is asleep until the IR command is received.

Figure 7:
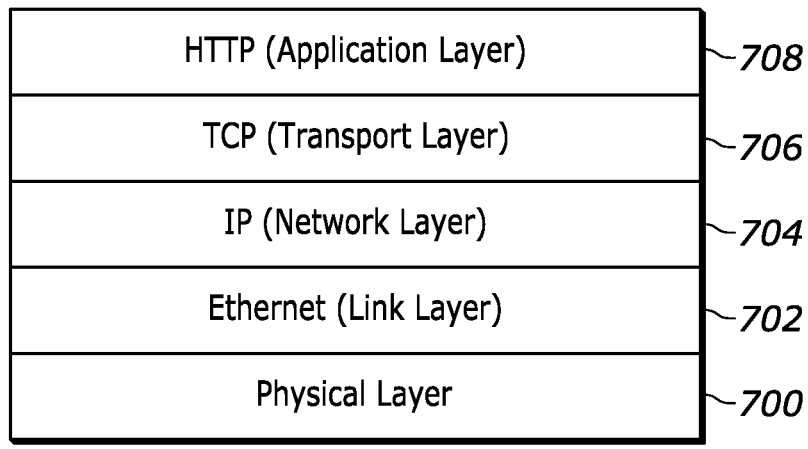
FIG. 7 illustrates an example networking stack.

FIG. 7 illustrates this further. In FIG. 7, an example stack is shown that may be used as the network stack 302 shown in FIG. 3. From the bottom up, the network stack includes a physical layer 700 on top of which is a link layer 702 such as an Ethernet layer. On top of the link layer 702 is a network layer 704 such as an IP layer, and on top of that is transport layer 706 such as a transmission control protocol (TCP) layer. On top of the transport layer 706 is an application layer 708 such as a hypertext transport protocol (HTTP) layer.

In the low power mode of the display device 202, one or more of these components of the stack may be deenergized to save power. In the low power mode, all of the components shown in FIG. 7 may be deenergized. In other embodiments, in the low power mode the physical layer 700 and link layer 702 remain energized, but the network layer 704, transport layer 706, and application layer 708 are deenergized.

Figure 8:
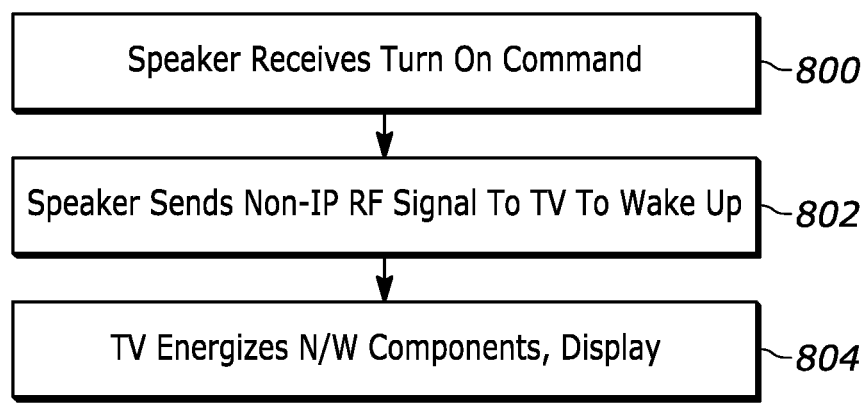
FIG. 8 illustrates third example logic in example flow chart format for emerging from low power mode operation of the display device.

In this latter case, low power communication between the networked device 208 and display device 202 for purposes of causing the display device 202 to enter the high-power mode from the low power mode may be effected by a non-IP RF wakeup signal. FIG. 8 illustrates a third technique for waking up the display device 202 that does not depend on IP network connectivity with the networked device 208. Commencing at block 800, the networked device 208 (such as a smart speaker) receives a command, e.g., a voice command, to energize the display 202. In response, the networked device 202 transmits, at block 802, a non-IP RF command such as an Ethernet command or Bluetooth or ZigBee command to the display device 202 to enter the high power mode in which the display device 202 energizes, at block 804, the display 204 shown in FIG. 2 as well as all of the network stack/network communication components 302 shown in FIG. 3 that were not energized in the low power mode. This communication is possible when, for example, the physical layer 700 and link layer 702 in FIG. 7 remain energized in the low power mode even though the network layer 704, transport layer 706, and application layer 708 are deenergized in the low power mode.

Thereafter, in the high-power mode, the display device 202 communicates with the networked device 208 over the network 200 shown in FIG. 2. For example, within a short period of time such as a second or two after sending the command to enter the high-power mode, the networked device 208 may send an IP-based discovery message to the display device 202 to poll the display device 202 to establish IP communication between the networked device and display device.

While the particular embodiments are herein shown and described in detail, it is to be understood that the subject matter which is encompassed by the present invention is limited only by the claims.

What is claimed is:

1. An assembly, comprising:
   at least one processor configured with instructions to:
   enter a low power mode of a controlled appliance comprising the at least one processor in which at least one video display of the controlled appliance is not activated to display images and at least one computer network communication element and/or system on a chip (SOC) processor of the controlled appliance is deenergized;
   responsive to an infrared (IR) command and/or sonic command and/or non-Internet Protocol (IP) radiofrequency (RF) command from a networked device, energize the video display and configure the at least one computer network communication element and the SOC processor in an energized mode that consumes more power than the low power mode; and
   within a period of time under two seconds after receiving the IR command and/or sonic command and/or non-IP RF command from the networked device, receive from the networked device, using the at least one computer network communication element, an IP-based discovery message polling the controlled appliance to establish IP communication between the controlled appliance and the networked device.

2. The assembly of claim 1, wherein the controlled appliance comprises a TV.

3. The assembly of claim 1, wherein the networked device comprises an Internet of Things (IoT) device configured to communicate via IP over a computer network.

4. The assembly of claim 1, wherein the at least one computer network communication element comprises at least a network layer, a transport layer, and an application layer in a network stack.

5. The assembly of claim 3, wherein the computer network comprises a home entertainment network.

6. The assembly of claim 1, wherein the networked device comprises a speaker assembly.

7. The assembly of claim 1, wherein the instructions are executable to:
   responsive to an IR command from the networked device, energize the video display and the at least one computer network communication element.

8. The assembly of claim 1, wherein the instructions are executable to:
   responsive to a computerized sonic chirp from the networked device, energize the video display and the at least one computer network communication element.

9. The assembly of claim 1, wherein the instructions are executable to:
   responsive to a non-IP RF command from the networked device, energize the video display and the at least one computer network communication element.

10. An assembly, comprising:
    at least one processor configured with instructions to:
    responsive to a command to energize a controlled appliance, transmit to the controlled appliance at least one infrared (IR) and/or sonic command and/or non-Internet Protocol (IP) radiofrequency (RF) command to cause the controlled appliance to activate at least one video display of the controlled appliance and at least one computer network communication element of the controlled appliance; and
    within a period of time under two seconds after transmitting the IR command and/or sonic command and/or non-IP RF command to the controlled appliance, transmit to the controlled appliance an IP-based discovery message polling the controlled appliance to establish IP communication between the controlled appliance and the assembly.

11. The assembly of claim 10, wherein the assembly comprises an Internet of Things (IoT) device configured to communicate via IP over a computer network.

12. The assembly of claim 10, wherein the at least one computer network communication element comprises at least part of a network stack, the part comprising at least a network layer, a transport layer, and an application layer in the network stack.

13. The assembly of claim 10, wherein the instructions are executable to:
    responsive to the command to energize the controlled appliance, transmit to the controlled appliance at least one non-IP RF command to cause the controlled appliance to energize the at least one video display of the controlled appliance and the at least one computer network communication element of the controlled appliance.

14. The assembly of claim 10, wherein the assembly comprises a speaker assembly.

15. The assembly of claim 10, wherein the instructions are executable to:
    responsive to the command to energize the controlled appliance, transmit to the controlled appliance at least one IR command to cause the controlled appliance to energize the at least one video display of the controlled appliance and the at least one computer network communication element of the controlled appliance.

16. The assembly of claim 10, wherein the instructions are executable to:
- responsive to the command to energize the controlled appliance, transmit to the controlled appliance at least one computer-generated sonic command to cause the controlled appliance to energize the at least one video display of the controlled appliance and the at least one computer network communication element of the controlled appliance.

\* \* \* \* \*